United States Patent [19]

Travis

[11] Patent Number: 5,538,302
[45] Date of Patent: Jul. 23, 1996

[54] ARTICLE HANDLING TOOL

[76] Inventor: Walton L. Travis, 4217 Maple Ave., Fairfax, Va. 22032

[21] Appl. No.: 320,738

[22] Filed: Oct. 11, 1994

[51] Int. Cl.[6] ........................................ B25J 1/04
[52] U.S. Cl. ............................ 294/24; 294/19.1
[58] Field of Search .................. 294/2, 19.1, 19.3, 294/22, 23, 24, 26, 50.6, 50.8, 51; 119/802, 803; 114/221 R

[56] References Cited

U.S. PATENT DOCUMENTS

| | | |
|---|---|---|
| 219,765 | 9/1879 | Reese . |
| D. 274,116 | 6/1984 | Lidikay et al. . |
| 323,130 | 7/1885 | Ellis . |
| 838,417 | 12/1906 | Jenkins . |
| 1,129,052 | 2/1915 | Senn . |
| 1,169,284 | 1/1916 | Potter . |
| 1,249,213 | 12/1917 | Senn . |
| 2,522,471 | 9/1950 | Underwood ............................. 119/803 |
| 2,582,339 | 1/1952 | Krueger ................................. 294/19.1 |
| 2,597,954 | 2/1952 | Schaller . |
| 3,224,404 | 12/1965 | De Jong ................................. 294/19.1 |
| 3,540,769 | 11/1970 | Rosser ................................... 294/19.1 |
| 3,878,808 | 4/1975 | Mock, Jr. .............................. 294/19.1 |
| 3,945,335 | 3/1976 | Kratz ..................................... 114/221 R |
| 4,286,893 | 9/1981 | Pomares . |
| 4,377,211 | 3/1983 | Voss . |
| 4,624,494 | 11/1986 | Huppert ................................ 294/19.1 |
| 5,003,907 | 4/1991 | Roach et al. . |

*Primary Examiner*—Dean Kramer
*Attorney, Agent, or Firm*—Diller, Ramik & Wight

[57] ABSTRACT

An article handling tool for pushing, pulling and manipulating articles on the bed of a covered or capped pick-up truck is defined by an elongated pole having a hand grip at one end and a push-pull blade at an opposite end. The opposite end also includes a retractable loop which can be housed within the pole in an unobtrusive inoperative position yet can be readily withdrawn from a chamber of the elongated pole and utilized to encircle or lasso an article. In this manner the loop end and/or the blade allows the article handling tool to be utilized by an individual to manipulate articles of any shape or size seated upon the bed of a covered pick-up truck without the effort and hazard involved heretofore as individuals necessarily climbed into and moved about in the cramped cargo area of such covered pick-up trucks.

16 Claims, 1 Drawing Sheet

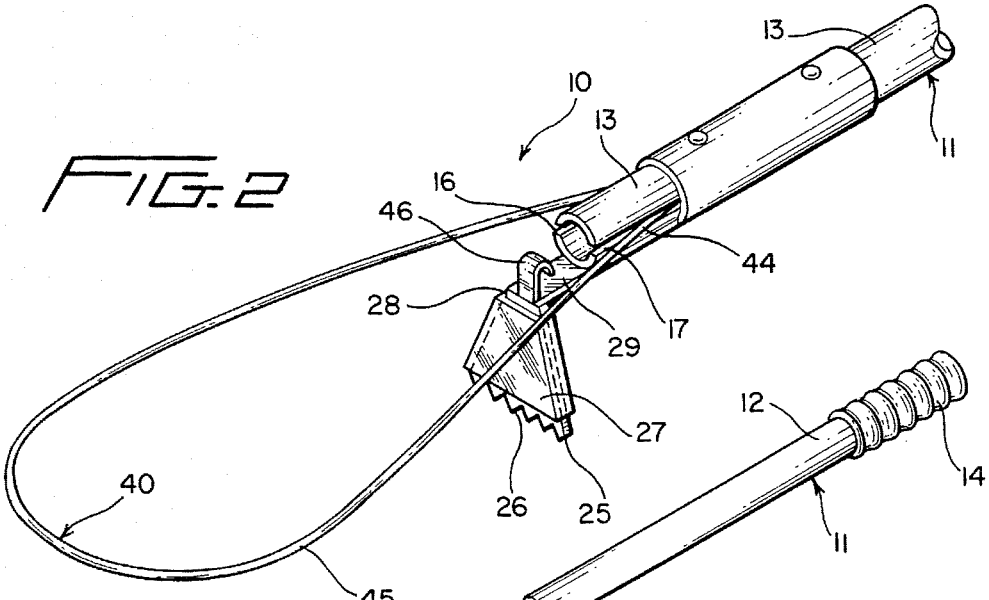
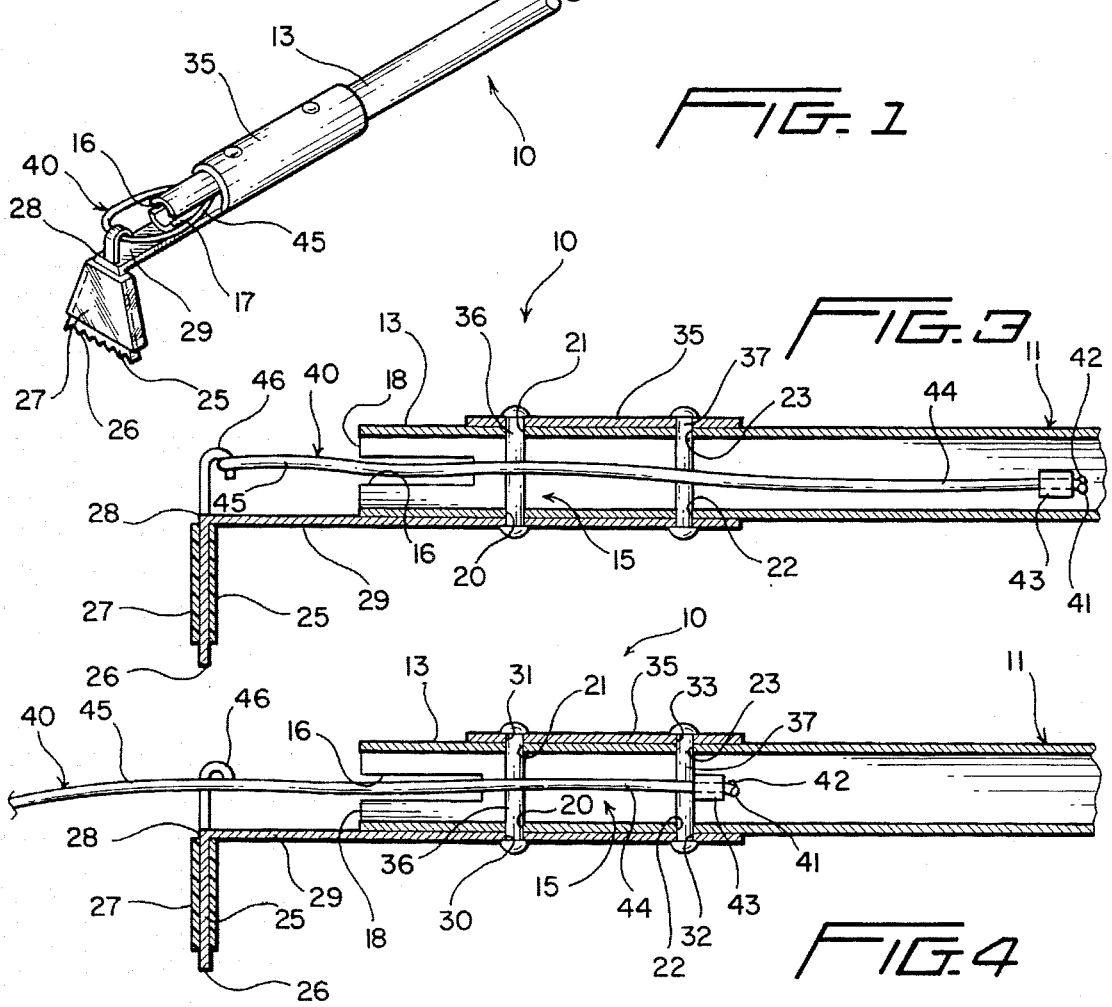

ARTICLE HANDLING TOOL

BACKGROUND OF THE INVENTION

There are several million small, medium and full size pick-up trucks on the road in the United States, and a great number of these are owned by individuals as a second or third vehicle for family use (general utility, shopping, sports, camping, etc.) and for one man or small business operations (carpenter, plumber, mason, electrician, etc.). A great number of these pick-up trucks have covers or bed "caps" that cover the cargo bed area of the pick-up truck leaving access to the cargo bed only from the rear of the pick-up truck. Cargo covers and caps are generally of a low profile and are accordingly difficult to enter and move about in by an individual. Typical cargo beds are anywhere from six to eight feet long and four to five feet wide, depending upon the particular pick-up truck and model. Most of these pick-up truck owners use the cargo bed to carry a miscellaneous number of small to medium articles, such as boxes, cartons, tools, tool boxes, containers, groceries, cans, etc. The length of the covered cargo bed necessarily requires that an individual crawl up into the cargo bed to place therein or remove therefrom or rearrange therein articles, particularly if such articles are more adjacent the cab end of the cargo bed than adjacent the tail,gate thereof. Most articles immediately adjacent the tailgate can be manipulated with little difficulty, whether or not the tailgate is dropped or not. However, articles that are spaced a considerable distance from the tailgate create a problem and injury can occur when an individual stretches and strains attempting to reach such articles. Just as hazardous is the strain and time consuming effort involved in climbing in, climbing about and climbing out of a covered pick-up truck bed, all of which can be physical injurious because of the awkward, cramped and/or stuped positions encountered by an individual during such activities.

In keeping with the foregoing, there is an obvious need for a tool to allow an individual standing at the rear of a covered or capped pick-up truck to be able to place, move, manipulate and retrieve articles on the cargo bed.

DESCRIPTION OF RELATED ART

Though not specifically designed with the purpose of manipulating articles upon the bed of a covered pick up truck, garden hoes are reflective of the type of tool to which the present invention is directed, namely, a tool having an elongated handle with a blade transverse thereto for manipulating and/or rearranging articles. Typical garden hoes are disclosed in U.S. Pat. No. 219,765 granted on Sep. 16, 1879 to Abram Reese and U.S. Pat. No. 323,130 granted on Jul. 28, 1885 to Josiah W. Ellis. Obviously, garden hoes of these types could be used to manipulate articles on the beds of covered pick-up trucks. Other garden implements, such as the weeder disclosed in U.S. Pat. No. 838,417 granted on Dec. 11, 1906 to William R. Jenkins and the stable rake granted to John Potter on Jan. 25, 1916 under U.S. Pat. No. 1,169,284 are adaptable to the purpose intended.

Such patents as U.S. Pat. Nos. 4,286,893 (Pomares), 1,249,213 (Senn), 2,597,954 (Schaller) and 4,377,211 (Voss) are exemplary of conventional connections between the handles of such gardening tools and the blades, tines or operative ends thereof.

Apart from agricultural tools or implements, U.S. Pat. No. 5,003,907 granted on Apr. 2, 1991 to John E. Roach et al. discloses a mooring and maneuvering device defined by an elongated pole having a hand grip and opposite thereto a pair of boat hooks of different shapes for different purposes, but also includes a loop which can be entrained about a mooring post in its operative position and pivoted back upon the pole in an inoperative position.

While these prior art patents are not undoubtedly all-inclusive, they are reflective of the type of tool or implement to which the present invention is directed.

SUMMARY OF THE INVENTION

The novel article handling tool of the present invention allows an individual standing at the rear of a covered pick-up truck to place, move, rearrange, manipulate and/or retrieve articles on the cargo bed over the full length and width thereof without having to climb up into the bed and doing so irrespective of the shape, size, width and volume thereof.

The article handling tool is essentially of the push and pull type, much in the manner of a conventional hoe except the article handling tool is specifically designed for the purposes stated, not merely raking or hoeing the earth. However, as distinguishable from a conventional hoe, rake or the like, the present article handling tool additionally includes a blade having a serrated edge which is also preferably, at least partially, covered with a non-marring plastic sheath to prevent scratching or marring of articles. Furthermore, a handle of the tool is preferably hollow to define a chamber which at least partially houses in sliding relationship thereto a plastic covered flexible wire loop. The loop is thereby maintained in an unobtrusive position in its inoperative housed or stored position but can be fully withdrawn from the chamber of the pole to be placed/lassoed around articles to permit such articles as might not be readily maneuverable by the blade to be maneuverable by the loop. The loop is thereby adapted for retrieving and manipulating odd shape articles or round articles that might not be readily engaged by the blade or hook of the tool. The tool also includes a retaining hook to hold the loop in its inoperative position and further includes one or more rivets or bolts which pass through the loop for preventing disengagement of the loop relative to the pole. The pole also includes a pair of diametrically opposite slots which serve to retain the loop in a fully open position in its position of use and also function to serve as guides for pushing the loop back into the chamber and retracting the loop therefrom. The article handling tool as thus constructed can be utilized to manipulate and rearrange virtually any article desired when located virtually anywhere upon the bed of a covered pick-up truck.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a fragmentary perspective view of a novel article handling tool of the present invention and illustrates an elongated pole, a rubber tubular gripping handle at one end thereof, a blade at an opposite end thereof and generally normal to an axis of the elongated pole, and a loop projecting from a chamber within the elongated pole and being held unobtrusively in an inoperative position by an associated small hook.

FIG. 2 is a fragmentary enlarged perspective view of a portion of the article handling tool of the present invention, and illustrates the loop in its operative position projecting beyond the chamber of the elongated pole through a pair of generally diametrically opposite elongated slots.

FIG. 3 is a fragmentary enlarged cross-sectional view taken through the longitudinal axis of the elongated pole of the article handling tool, and more clearly illustrates the loop in its inoperative position entrained about a pair of pins which also unite a tubular collar of the blade to the pole.

FIG. 4 is a fragmentary cross-sectional view similar to FIG. 3, but illustrates the components of the article handling tool in the operative or extended position of the loop.

DESCRIPTION OF THE PREFERRED EMBODIMENTS

A novel article handling tool constructed in accordance with this invention is generally designated by the reference numeral 10 and, as aforesaid, is particularly designed for utilization by an individual standing at the rear of a covered pick-up truck to push, pull, rearrange, lasso, entrain and/or otherwise manipulate a wide variety of articles.

The article handling tool 10 includes an elongated generally cylindrical pole 11 having a first end or end portion 12 and a second opposite end or end portion 13. The elongated pole 11 is preferably constructed from relatively lightweight tubular metallic material, such as aluminum or similar lightweight material, including polymeric/copolymeric plastic material. Preferably a rubber or plastic handle or grip 14 is appropriately secured to the end portion 12 of the elongated pole 11 (FIG. 1).

At the end portion 13 of the elongated pole 11, the tubular nature of the latter defines an interior chamber or housing which is generally designated by the reference numeral 15 (FIGS. 3 and 4). The end portion 13 further includes two diametrically opposite slots or guide means 16, 17 which open axially through an annular end edge or face 18 of the end portion 13. Diametrically opposite circular openings 20, 21 and 22, 23 (FIGS. 3 and 4) are formed in the end 13.

Blade means 25 in the form of a relatively flat metallic or polymeric/copolymeric plastic member or blade having a plurality of serrations 26 and covered by a plastic sheath 27 (when the blade 25 is metal) is disposed generally normal to the central longitudinal axis (unnumbered) of the elongated pole 11. The blade means or blade 25 is integrally joined at a bend 28 to an elongated plate 29 which includes a cylindrical tubular portion or collar 35 having pairs of diametrically aligned openings 30, 31 and 32, 33. As is readily apparent in FIGS. 3 and 4, the openings 20, 30, 21 and 31 are axially aligned with each other as are the openings 22, 32, 23 and 33. The collar 35 is in external telescoped position relative to the cylindrical tubular portion 35 at the end portion 13 of the elongated pole 11. Pins 36, 37 having upset heads (unnumbered) are passed through the respective openings 20, 30, 21 and 31 and 22, 32, 23 and 33 to rigidly connect the cylindrical tubular portion 35 to the end portion 13 of the pole 11. In lieu of the pins or rivets 36, 37, suitable threaded nuts and bolts can be utilized for the same purpose.

Loop means in the form of an endless closed loop 40 is partially housed within the housing means or chamber 15. The loop 40 is a flexible multi-strand wire sheathed in plastic and having ends 41, 42 fastened together in a conventional fashion by a metallic ferrule 43. The closed loop is generally of an oval configuration having an interior end portion 44 and an exterior end portion 45. As is readily apparent in FIGS. 3 and 4, the loop 40 entrains the pins 36, 37 and thus, the pins 36, 37, specifically the pin 37 defines means for preventing the loop 40 from being withdrawn totally from the chamber 15 with the maximum position of the projected end 45 of the loop 40 being illustrated in FIG. 2. The latter is the use position of the loop 40 during which the loop portion 45 can be entrained about or lassoed over an article to manipulate the same. However, when it is desired to utilize the blade 25, the loop 40 is pushed back into the chamber 15 to the position shown in FIG. 3 and the same is held unobtrusively in this housed position by an integral small downwardly opening hook 46 forming an integral portion of the plate 29, as is best shown in FIGS. 1 and 3 of the drawings. It is also to be particularly noted that the loop 40 will slide within and along the slots 16, 17 both during sliding movement of the loop from the chamber 15 to the exterior thereof to the use position of FIG. 2, as well as back from the position shown in FIG. 2 to the position shown in FIGS. 1 and 3. Thus, the slots 16, 17 not only serve to guide the movement of the loop 40 into and out of the chamber 15, but when the loop 40 projects outwardly of the chamber in its use position, as shown in FIG. 2, the end portion 44 of the loop 40 rests upon the lower edges (unnumbered) of the slots 16, 17 which support, stabilize and maintain the larger open end portion 45 fully open to thereby permit the latter to be easily looped or lassoed upon an associated article.

From the foregoing, it is relatively apparent that due to the loop portion 45 of the loop 40 best shown in FIG. 2, articles of odd or circular shapes can be relatively easily manipulated if the same are not readily manipulated by the blade 25. However, the blade 25 and/or the loop 40 can singularly, as well as collectively, permit virtually any article to be appropriately manipulated by an individual from the rear of a covered pick-up truck. Obviously, the blade 25 is relatively flat and, therefore, is particularly adapted for pushing and pulling articles with relatively flat sides, such as boxes, tool boxes, etc., while the loop 40 more readily can be used to move circular or cylindrical objects, such as paint cans, water containers, liquid fuel containers, buckets or the like. Furthermore, since both the blade 25 and the loop 40 is covered with plastic, any article which is manipulated will neither be marred nor damaged upon operation of the article-handling tool 10.

Although a preferred embodiment of the invention has been specifically illustrated and described herein, it is to be understood that minor variations may be made in the apparatus without departing from the spirit and scope of the invention, as defined the appended claims.

I claim:

1. An article handling tool comprising a relatively elongated pole having a handle end and an opposite end remote from said handle end; said elongated pole having a longitudinal axis; blade means at said opposite end disposed generally transverse to said longitudinal axis for pushing, pulling and rearranging articles upon manipulation of said elongated pole; loop means at said opposite end for entraining and rearranging articles upon manipulation of said elongated pole, means for housing said loop means in an unobtrusive inoperative position relative to said blade means to prevent said loop means from interfering with article manipulation by said blade means, said housing means defining a chamber for at least partially housing said loop means in said inoperative position, said loop means is defined by an endless closed loop of a generally narrow oval configuration when in said inoperative position, said oval closed loop having generally opposite end portions, and in said inoperative position a first of said loop end portions is within said chamber and a second of said loop end portions is externally of said chamber.

2. The article handling tool as defined in claim 1 wherein said loop means and said opposite end are constructed and arranged in relatively sliding relationship to each other, and means for preventing total disengagement between said loop means and said opposite end.

3. The article handling tool as defined in claim 1 wherein said loop means and said opposite end are constructed and arranged in relatively sliding relationship to each other, and means for guiding the relative sliding movement of loop means relative to said opposite end.

4. The article handling tool as defined in claim 1 including means for preventing total disengagement between said loop and said opposite end.

5. The article handling tool as defined in claim 1 including means for guiding relative sliding movement of said loop relative to said opposite end.

6. The article handling tool as defined in claim 1 including means for guiding relative sliding movement of said loop relative to said opposite end, and said guiding means are a pair of slots in sliding embracing relationship to said loop.

7. An article handling tool comprising a relatively elongated pole having a handle end and an opposite end remote from said handle end; said elongated pole having a longitudinal axis; blade means at said opposite end disposed generally transverse to said longitudinal axis for pushing, pulling and rearranging articles upon manipulation of said elongated pole; loop means at said opposite end for entraining and rearranging articles upon manipulation of said elongated pole, means for housing said loop means in an unobtrusive inoperative position relative to said blade means to prevent said loop means from interfering with article manipulation by said blade means, said housing means defining a chamber for at least partially housing said loop means in said inoperative position, said loop means is defined by an endless closed loop of a generally narrow oval configuration when in said inoperative position, said oval closed loop having generally opposite end portions, in said inoperative position a first of said loop end portions is within said chamber and a second of said loop end portions is externally of said chamber, and hook means for securing said second loop end portion to said opposite end in said inoperative position.

8. The article handling tool as defined in claim 7 wherein said loop means and said opposite end are constructed and arranged in relatively sliding relationship to each other, and means for preventing total disengagement between said loop means and said opposite end.

9. The article handling tool as defined in claim 7 wherein said loop means and said opposite end are constructed and arranged in relatively sliding relationship to each other, and means for guiding the relative sliding movement of loop means relative to said opposite end.

10. The article handling tool as defined in claim 7 including means for preventing total disengagement between said loop and said opposite end.

11. The article handling tool as defined in claim 7 including means for guiding the relative sliding movement of said loop relative to said opposite end.

12. The article handling tool as defined in claim 7 including means for guiding the relative sliding movement of said loop relative to said opposite end, and said guiding means are a pair of sloes in sliding embracing relationship to said loop.

13. An article handling tool comprising a relatively elongated pole having a handle end and an opposite end remote from said handle end; said elongated pole having a longitudinal axis; blade means at said opposite end disposed generally transverse to said longitudinal axis for pushing, pulling and rearranging articles upon manipulation of said elongated pole; loop means at said opposite end for entraining and rearranging articles upon manipulation of said elongated pole, means for housing said loop means in an unobtrusive inoperative position relative to said blade means to prevent said loop means from interfering with article manipulation by said blade means, said loop means and said opposite end are constructed and arranged in relatively sliding relationship to each other, means for preventing total disengagement between said loop means and said opposite end, said loop means is defined by an endless closed loop, and said disengagement preventing means is a pin at said opposite end entrained by said loop.

14. The article handling tool as defined in claim 13 wherein said housing means defines a chamber for at least partially housing said loop means in said inoperative position, and said disengagement preventing pin generally spans said chamber and is entrained by said loop.

15. The article handling tool as defined in claim 14 including means for guiding the relative sliding movement of said loop relative to said opposite end.

16. The article handling tool as defined in claim 14 including means for guiding the relative sliding movement of said loop relative to said opposite end, and said guiding means are a pair of slots in sliding embracing relationship to said loop.

* * * * *